United States Patent
Nishikawa et al.

(10) Patent No.: US 8,315,459 B2
(45) Date of Patent: Nov. 20, 2012

(54) LOSSLESS COMPRESSION-ENCODING DEVICE AND DECODING DEVICE FOR IMAGE DATA

(75) Inventors: Yukinari Nishikawa, Hamamatsu (JP); Mitsuhiro Honme, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 574 days.

(21) Appl. No.: 12/586,899

(22) Filed: Sep. 29, 2009

(65) Prior Publication Data

US 2010/0080475 A1    Apr. 1, 2010

(30) Foreign Application Priority Data

Sep. 30, 2008  (JP) ................. 2008-255206

(51) Int. Cl.
   *G06K 9/36* (2006.01)
(52) U.S. Cl. ........... 382/166; 382/233; 382/244
(58) Field of Classification Search ............. 382/166, 382/233, 238, 244, 246
   See application file for complete search history.

(56) References Cited

U.S. PATENT DOCUMENTS

| | | | |
|---|---|---|---|
| 5,680,129 A | | 10/1997 | Weinberger et al. |
| 5,764,374 A | * | 6/1998 | Seroussi et al. ............ 382/244 |
| 5,960,116 A | * | 9/1999 | Kajiwara .................. 382/238 |
| 6,611,620 B1 | | 8/2003 | Kobayashi et al. |
| 6,785,425 B1 | | 8/2004 | Feder et al. |
| 2005/0226500 A1 | | 10/2005 | Sasaki et al. |
| 2007/0122046 A1 | * | 5/2007 | Cai et al. ................. 382/239 |

FOREIGN PATENT DOCUMENTS

| | | |
|---|---|---|
| CN | 101233542 A | 7/2008 |
| JP | 09-37271 | 2/1997 |
| JP | 2005-286879 | 10/2005 |
| WO | WO 2006/126949 A1 | 11/2006 |

OTHER PUBLICATIONS

The State Intellectual Property Office of The People's Republic of China, "Notification of First Office Action" re: Chinese Patent Application No. 200910204483.6 dated Aug. 31, 2011, 5 pages.

(Continued)

*Primary Examiner* — Phuoc Tran
(74) *Attorney, Agent, or Firm* — Pillsbury Winthrop Shaw Pittman LLP

(57) ABSTRACT

In a lossless compression-encoding device, a calculation part calculates differences between different types of pixel data representing the first, second and third color components of an image, and outputs the calculated differences as a plurality of types of difference data. A lossless compression-encoding part performs lossless compression-encoding on each of color component data which include the different types of the pixel data representing the first to third color components and the plurality of the types of the difference data, and outputs a plurality of types of compressed data which correspond to the respective types of the color component data. A comparison and selection part compares amounts of data of the plurality of the types of the compressed data obtained from the lossless compression-encoding, and selects a combination of three types of compressed data corresponding to three types of color component data capable of synthesizing the respective pixel data representing the first, second and third color components such that a total amount of data of the selected combination is smaller than a total amount of data of other combinations of the compressed data.

3 Claims, 8 Drawing Sheets

OTHER PUBLICATIONS

Japanese Patent Office, "First Office Action" re: Patent Application Serial No. 2008-255206, Drafting Date: Jun. 21, 2012, pp. 1-3.

European Search Report of European Patent Application No. EP 09 17 1819, dated Aug. 6, 2010, 7 pages.

Soren Forchhammer & Nasir Memon: "Document and Image Compression, Chapter 5: Lossless Image Coding" Internet Citation dated May 26, 2006, pp. 113-143, Retrieved from the Internet: URL: http://www.engnetbase.com, 17 pages.

Larisa Goffman-Vinopal & Moshe Porat: "Color Image Compression Using Inter-color Correlation", International Conference on Image Processing (ICIP), vol. 2, dated Sep. 22, 2002, pp. 353-356, 7 pages.

* cited by examiner

| COMPRESSION OBJECT | Normal | Mode 1 | Mode 2 | Mode 3 |
|---|---|---|---|---|
| 1ST COLOR COMPONENT R' | R | R | G−R | B−R |
| 2ND COLOR COMPONENT G' | G | R−G | G | B−G |
| 3RD COLOR COMPONENT B' | B | R−B | G−B | B |
| MODE SIGNAL | 00 | 01 | 10 | 11 |

TARGET PIXEL X

| OUTPUT DATA | INPUT DATA | | | |
|---|---|---|---|---|
| | 8 BITS | 6 BITS | 5 BITS | 4 BITS |
| −1,1 | 255,−255 | 63,−63 | 31,−31 | 15,−15 |
| −3,−2,2,3 | 253,254,−254,−253 | 61,62,−62,−61 | 29,30,−30,−29 | 13,14,−14,−13 |
| −7..−4,4..7 | 249..252,−252..−249 | 57..60,−60..−57 | 25..28,−28..−25 | 9..12,−12..−9 |
| −15..−8,8..15 | 241..248,−248..−241 | 49..56,−56..−49 | 17..24,−24..−17 | 8 |
| −31..−16,16..31 | 225..240,−240..−225 | 33..48,−48..−33 | 16 | |
| −63..−32,32..63 | 193..224,−224..−193 | 32 | | |
| −127..−64,64..127 | 129..192,−192..−129 | | | |
| −255..−128,128..255 | 128 | | | |

FIG.6

| DECIMAL | BINARY |  | BINARY | DECIMAL |
|---|---|---|---|---|
| 63 | 0 1 1 1 1 1 1 | → | 1 1 1 1 1 1 1 | −1 |
| 62 | 0 1 1 1 1 1 0 | → | 1 1 1 1 1 1 0 | −2 |
| 61 | 0 1 1 1 1 0 1 | → | 1 1 1 1 1 0 1 | −3 |
| 60 | 0 1 1 1 1 0 0 | → | 1 1 1 1 1 0 0 | −4 |
| 59 | 0 1 1 1 0 1 1 | → | 1 1 1 1 0 1 1 | −5 |
| 58 | 0 1 1 1 0 1 0 | → | 1 1 1 1 0 1 0 | −6 |
| 57 | 0 1 1 1 0 0 1 | → | 1 1 1 1 0 0 1 | −7 |
| 56 | 0 1 1 1 0 0 0 | → | 1 1 1 1 0 0 0 | −8 |
| 55 | 0 1 1 0 1 1 1 | → | 1 1 1 0 1 1 1 | −9 |
| 54 | 0 1 1 0 1 1 0 | → | 1 1 1 0 1 1 0 | −10 |
| 53 | 0 1 1 0 1 0 1 | → | 1 1 1 0 1 0 1 | −11 |
| 52 | 0 1 1 0 1 0 0 | → | 1 1 1 0 1 0 0 | −12 |
| 51 | 0 1 1 0 0 1 1 | → | 1 1 1 0 0 1 1 | −13 |
| 50 | 0 1 1 0 0 1 0 | → | 1 1 1 0 0 1 0 | −14 |
| 49 | 0 1 1 0 0 0 1 | → | 1 1 1 0 0 0 1 | −15 |
| 48 | 0 1 1 0 0 0 0 | → | 1 1 1 0 0 0 0 | −16 |
| ∫ | ∫ |  | ∫ | ∫ |
| 35 | 0 1 1 0 0 1 1 | → | 1 1 0 0 0 1 1 | −29 |
| 34 | 0 1 0 0 0 1 0 | → | 1 1 0 0 0 1 0 | −30 |
| 33 | 0 1 0 0 0 0 1 | → | 1 1 0 0 0 0 1 | −31 |
| 32 | 0 1 0 0 0 0 0 |  | 1 1 0 0 0 0 0 | −32 |
| 31 | 0 0 1 1 1 1 1 | ← | 1 0 1 1 1 1 1 | −33 |
| 30 | 0 0 1 1 1 1 0 | ← | 1 0 1 1 1 1 0 | −34 |
| 29 | 0 0 1 1 1 0 1 | ← | 1 0 1 1 1 0 1 | −35 |
| ∫ | ∫ |  | ∫ | ∫ |
| 3 | 0 0 0 0 0 1 1 | ← | 1 0 0 0 0 1 1 | −61 |
| 2 | 0 0 0 0 0 1 0 | ← | 1 0 0 0 0 1 0 | −62 |
| 1 | 0 0 0 0 0 0 1 | ← | 1 0 0 0 0 0 1 | −63 |
| 0 | 0 0 0 0 0 0 0 |  |  |  |

FIG.7

| ENCODING TARGET | S | CODE | ADDITIONAL BITS |
|---|---|---|---|
| −1,1 | 1 | 01 | 0,1 |
| −3,−2,2,3 | 2 | 10 | 00,01,10,11 |
| −7..−4,4..7 | 3 | 110 | 000..011,100..111 |
| −15..−8,8..15 | 4 | 1110 | 0000..0111,1000..1111 |
| −31..−16,16..31 | 5 | 11110 | 00000..01111,10000..11111 |
| −63..−32,32..63 | 6 | 111110 | 000000..011111,100000..111111 |
| −127..−64,64..127 | 7 | 1111110 | 0000000..0111111,1000000..1111111 |
| −255..−128,128..255 | 8 | 11111110 | 00000000..01111111,10000000..11111111 |
| −256,256 | 9 | 111111110 | NONE |
| ZRL=1 | 9 | 000 | NONE |
| ZRL=2...3 | 10 | 0010 | 0,1 |
| ZRL=4...7 | 11 | 00110 | 00,01,10,11 |
| ALL 0 | 12 | 001110 | NONE |
| ZRL=8...15 | 13 | 0011110 | 000...111 |
| ZRL=16...31 | 14 | 00111110 | 0000...1111 |
| ZRL=32...63 | 15 | 001111110 | 00000...11111 |
| ZRL=64...127 | 16 | 0011111110 | 000000...111111 |
| ZRL=128...255 | 17 | 00111111110 | 0000000...1111111 |
| ZRL=256...511 | 18 | 001111111110 | 00000000...11111111 |
| ZRL=512...1023 | 19 | 0011111111110 | 000000000...111111111 |

FIG.8

| SIGNAL TO BE DECODED | Normal | Mode 1 | Mode 2 | Mode 3 |
|---|---|---|---|---|
| 1ST COLOR COMPONENT R | R′ | R′ | G′ −R″ | B′ −R″ |
| 2ND COLOR COMPONENT G | G′ | R′ −G″ | G′ | B′ −G″ |
| 3RD COLOR COMPONENT B | B′ | R′ −B″ | G′ −B″ | B′ |

FIG. 9

| OBJECT IMAGE SIZE | SIZE, ETC. | | | ENTROPY (bit/pixel) | | | | | | | | |
|---|---|---|---|---|---|---|---|---|---|---|---|---|
| | | | | Mode 1 | | | Mode 2 | | | Mode 3 | | |
| | H | W | TONE | R | G-R | B-R | G | R-G | B-G | B | G-B | R-B |
| Aerial | 256 | 256 | 8 | 7.31 | 6.81 | 7.23 | 7.33 | 6.81 | 6.14 | 7.16 | 6.14 | 7.23 |
| | | | ± | | 0.50 | 0.08 | | 0.52 | 1.19 | | 1.02 | (0.07) |
| Airplane | 256 | 256 | 8 | 6.75 | 4.72 | 5.75 | 6.84 | 4.72 | 5.49 | 6.22 | 5.49 | 5,76 |
| | | | ± | | 2.03 | 1.00 | | 2.12 | 1.35 | | 0.73 | 0.46 |
| Balloon | 256 | 256 | 8 | 6.60 | 5.88 | 6.55 | 6.68 | 5.88 | 5.98 | 7.01 | 5.98 | 6.55 |
| | | | ± | | 0.72 | 0.05 | | 0.80 | 0.70 | | 1.03 | 0.46 |
| Earth | 256 | 256 | 8 | 6.42 | 6.06 | 5.96 | 7.24 | 6.06 | 6.22 | 6.53 | 6.22 | 5.96 |
| | | | ± | | 0.36 | 0.46 | | 1.18 | 1.02 | | 0.31 | 0.57 |
| Girl | 256 | 256 | 8 | 6.42 | 6.40 | 6.61 | 6.45 | 6.40 | 5.33 | 6.38 | 5.33 | 6.61 |
| | | | ± | | 0.02 | (0.19) | | 0.05 | 1.12 | | 1.05 | (0.23) |
| Lenna | 256 | 256 | 8 | 7.25 | 6.53 | 7.03 | 7.60 | 6.53 | 6.60 | 6.94 | 6.60 | 7.03 |
| | | | ± | | 0.72 | 0.22 | | 1.07 | 1.00 | | 0.34 | (0.09) |
| Mandrill | 256 | 256 | 8 | 7.63 | 7.24 | 8.09 | 7.39 | 7.24 | 7.09 | 7.70 | 7.09 | 8.09 |
| | | | ± | | 0.39 | (0.46) | | 0.15 | 0.30 | | 0.61 | (0.39) |
| Parrots | 256 | 256 | 8 | 7.25 | 6.99 | 7.28 | 7.49 | 6.99 | 7.01 | 7.24 | 7.01 | 7.28 |
| | | | ± | | 0.26 | (0.03) | | 0.50 | 0.48 | | 0.23 | (0.04) |
| Pepper | 256 | 256 | 8 | 7.32 | 7.68 | 7.47 | 7.50 | 7.68 | 6.96 | 7.06 | 6.96 | 7.47 |
| | | | ± | | (0.36) | (0.15) | | (0.18) | 0.54 | | 0.10 | (0.41) |
| Sailboat | 256 | 256 | 8 | 7.23 | 7.13 | 7.21 | 7.60 | 7.13 | 6.00 | 7.18 | 6.00 | 7.21 |
| | | | ± | | 0.10 | 0.02 | | 0.47 | 1.60 | | 1.18 | (0.03) |
| milkdrop | 256 | 256 | 8 | 6.95 | 7.33 | 7.20 | 6.92 | 7.33 | 6.32 | 6.07 | 6.32 | 7.20 |
| | | | ± | | (0.38) | (0.25) | | (0.41) | 0.60 | | (0.25) | (1.13) |
| couple | 256 | 256 | 8 | 6.25 | 5.57 | 6.21 | 5.96 | 5.57 | 5.22 | 5.93 | 5.22 | 6.21 |
| | | | ± | | 0.68 | 0.04 | | 0.39 | 0.74 | | 0.71 | (0.28) |

FIG.10

| | SIZE | | WORST VALUE OF COMPRESSION RATIOS OF LINES | | | | | COMPRESSION RATIO OF ENTIRE IMAGE | | | | |
|---|---|---|---|---|---|---|---|---|---|---|---|---|
| | H | W | Normal | Mode 1 | Mode 2 | Mode 3 | Best | Normal | Mode 1 | Mode 2 | Mode 3 | Best |
| Aerial | 256 | 256 | 100.79 | 97.36 | 92.07 | 99.28 | 92.07 | 93.88 | 90.05 | 85.87 | 92.22 | 85.87 |
| | ± | | | 3.43 | 8.72 | 1.51 | G | | 3.38 | 8.01 | 1.66 | G |
| Airplane | 256 | 256 | 96.84 | 85.37 | 86.00 | 85.51 | 85.37 | 65.49 | 60.92 | 60.13 | 59.12 | 59.12 |
| | ± | | | 11.47 | 10.84 | 11.33 | R | | 4.57 | 5.36 | 6.37 | B |
| Balloon | 256 | 256 | 67.59 | 59.59 | 60.25 | 62.87 | 59.59 | 55.25 | 49.41 | 49.66 | 53.91 | 49.41 |
| | ± | | | 8.00 | 7.34 | 4.72 | R | | 5.84 | 5.59 | 1.34 | R |
| Earth | 256 | 256 | 86.07 | 73.68 | 82.41 | 73.39 | 73.39 | 70.82 | 61.88 | 67.43 | 62.42 | 61.88 |
| | ± | | | 12.39 | 3.66 | 12.68 | B | | 8.94 | 3.39 | 8.40 | R |
| Girl | 256 | 256 | 82.65 | 80.13 | 78.24 | 85.01 | 78.24 | 70.03 | 73.52 | 67.88 | 72.68 | 67.88 |
| | ± | | | 2.52 | 4.41 | (2.36) | G | | (3.49) | 2.15 | (2.65) | G |
| Lenna | 256 | 256 | 87.76 | 78.81 | 79.52 | 78.78 | 78.78 | 74.38 | 69.59 | 69.70 | 69.21 | 69.21 |
| | ± | | | 8.95 | 8.24 | 8.98 | B | | 4.79 | 4.68 | 5.17 | B |
| Mandrill | 256 | 256 | 148.86 | 127.77 | 129.95 | 136.23 | 127.77 | 99.75 | 92.76 | 91.40 | 95.67 | 91.40 |
| | ± | | | 21.09 | 18.91 | 12.63 | R | | 6.99 | 8.35 | 4.08 | G |
| Parrots | 256 | 256 | 91.37 | 68.64 | 67.24 | 68.36 | 67.24 | 64.61 | 55.16 | 54.37 | 56.67 | 54.37 |
| | ± | | | 22.73 | 24.13 | 23.01 | G | | 9.45 | 10.24 | 7.94 | G |
| Pepper | 256 | 256 | 82.67 | 79.22 | 82.31 | 86.13 | 79.22 | 69.77 | 70.08 | 69.65 | 69.16 | 69.16 |
| | ± | | | 3.45 | 0.36 | (3.46) | R | | (0.31) | 0.12 | 0.61 | B |
| Sailboat | 256 | 256 | 90.17 | 80.32 | 84.57 | 82.41 | 80.32 | 70.18 | 65.78 | 66.91 | 63.71 | 63.71 |
| | ± | | | 9.85 | 5.60 | 7.76 | R | | 4.40 | 3.27 | 6.47 | B |
| milkdrop | 256 | 256 | 70.49 | 71.08 | 72.92 | 71.31 | 70.49 | 55.45 | 57.56 | 60.27 | 55.35 | 55.35 |
| | ± | | | (0.57) | (2.43) | (0.82) | No Dif | | (2.11) | (4.82) | 0.10 | B |
| couple | 256 | 256 | 86.65 | 82.88 | 79.04 | 84.72 | 79.04 | 64.35 | 63.99 | 59.83 | 64.39 | 59.83 |
| | ± | | | 3.77 | 7.61 | 1.93 | G | | 0.36 | 4.52 | (0.04) | G |

FIG.11

| ENCODING TARGET | H | W | JPEG-LS | THIS EMBODIMENT | ±(%) |
|---|---|---|---|---|---|
| btn_arw_right_01 | 80 | 56 | 26.05 | 18.09 | 7.96 |
| btn_cam_B_01 | 80 | 56 | 36.59 | 26.8 | 9.79 |
| btn_cam_B_02 | 80 | 56 | 40.04 | 33.67 | 6.37 |
| btn_cam_FB_01 | 80 | 56 | 46.67 | 33.67 | 13 |
| btn_cam_FB_02 | 80 | 56 | 47.68 | 42.1 | 5.58 |
| btn_eject_01 | 80 | 56 | 34.96 | 18.21 | 16.75 |
| btn_eject_02 | 80 | 56 | 33.82 | 27.88 | 5.94 |
| btn_menu_right_01 | 56 | 144 | 22.04 | 18.19 | 3.85 |
| btn_ok_02 | 120 | 48 | 26.17 | 12.66 | 13.51 |
| btn_play_02 | 160 | 56 | 19.08 | 13.03 | 6.05 |
| btn_rec_01 | 80 | 56 | 32.11 | 18.68 | 13.43 |
| btn_rec_02 | 80 | 56 | 32.51 | 27.71 | 4.8 |
| btn_return_01 | 128 | 56 | 23.19 | 16.45 | 6.74 |
| btn_set_02 | 120 | 56 | 28.99 | 21.8 | 7.19 |
| btn_sub_calib_02 | 200 | 48 | 40.57 | 28.99 | 11.58 |
| btn_sub_voldwn_01 | 104 | 48 | 40.24 | 35.47 | 4.77 |
| btn_sub_volup_01 | 104 | 48 | 46.17 | 41.83 | 4.34 |
| i_drec_S_02 | 64 | 64 | 59.48 | 58.8 | 0.68 |
| i_dvd_S_02 | 64 | 64 | 56.89 | 56.4 | 0.49 |
| i_fm_L_02 | 120 | 120 | 17.17 | 13.45 | 3.72 |
| i_fm_S_02 | 64 | 64 | 35.5 | 31.71 | 3.79 |
| i_mail_L_02 | 120 | 120 | 18.09 | 15.54 | 2.55 |
| i_mediap_L_01 | 120 | 120 | 17.72 | 13.87 | 3.85 |
| i_mediap_S_02 | 64 | 64 | 33.05 | 30.09 | 2.96 |
| i_sndset_L_01 | 120 | 120 | 15.44 | 10.84 | 4.6 |
| i_sndset_S_02 | 64 | 64 | 33.49 | 31.14 | 2.35 |
| op_11 | 504 | 304 | 3.19 | 2.97 | 0.22 |
| op_24 | 496 | 296 | 3.77 | 3.82 | −0.05 |
| p_fmlv_03 | 96 | 64 | 31.77 | 28.86 | 2.91 |
| p_slidebg_S | 264 | 40 | 21.99 | 9.05 | 12.94 |

US 8,315,459 B2

LOSSLESS COMPRESSION-ENCODING DEVICE AND DECODING DEVICE FOR IMAGE DATA

BACKGROUND OF THE INVENTION

1. Technical Field of the Invention

The present invention relates to a lossless compression-encoding device and a decoding device for image data.

2. Description of the Related Art

Image data compression technologies can be mainly classified into lossy compression technologies and lossless compression technologies. lossy compression technologies mostly use orthogonal transformation and have an advantage in that they obtain a high compression ratio although it is not possible to completely reconstruct original image data from compressed data.

One example of lossless compression technology is JPEG-Lossless (JPEG-LS) of the Joint Photographic Experts Group (JPEG) which performs compression using both differential coding and variable-length coding. This type of lossless compression technology has an advantage in that it is possible to completely reconstruct original image data from compressed data although a high compression ratio is not obtained. Therefore, this lossless compression technology is used for purposes such as storage or exchange of medical images. One lossless compression technology is described in Japanese Patent Application Publication No. Heisei 9-37271.

A variety of image processing devices, which read and decode compressed data of an image of a sprite from a memory and which display the decoded sprite image on a monitor, have been provided. When there is a need to completely reconstruct the same sprite image as before compression, these image processing devices need to generate compressed data of a sprite image that is to be stored in a memory using the lossless compression technology and then to decode the compressed data read from the memory. However, the amount of the compressed data of the sprite image is large if the compressed data is generated using the lossless compression technology. Thus, it takes time to read compressed data required to decode the sprite image from the memory and it is not possible to transmit the compressed data to a decoder in the image processing device within a set period and thus it is not possible to display a sufficient amount of sprite image on a screen.

SUMMARY OF THE INVENTION

The invention has been made in of the above circumstances and it is an object of the invention to provide a lossless compression technology which achieves a higher compression ratio than a compression ratio obtained by a conventional lossless compression technology.

The invention provides a lossless compression-encoding device for compression of pixels of an image, each pixel being composed of different types of pixel data corresponding to first, second and third color components of the image. The inventive lossless compression-encoding device comprises: a calculation part that calculates differences between the different types of the pixel data representing the first, second and third color components of the image, and that outputs the calculated differences as a plurality of types of difference data; a lossless compression-encoding part that performs lossless compression-encoding on each of color component data which include the different types of the pixel data representing the first to third color components and the plurality of the types of the difference data, and that outputs a plurality of types of compressed data which correspond to the respective types of the color component data; and a comparison and selection part that compares amounts of data of the plurality of the types of the compressed data obtained from the lossless compression-encoding, and that selects, as an output target, a combination of three types of compressed data corresponding to three types of color component data capable of synthesizing the respective pixel data representing the first, second and third color components such that a total amount of data of the selected combination is smaller than a total amount of data of other combinations of the compressed data.

Generally, color components of a color image are not independent of each other and instead are strongly correlated. In the invention, differences of pixel data between different types of color components are compressed and therefore it is possible to remove redundancy of data that is to be compressed (i.e., a common part of pixel data of each color component) and to reduce the dynamic range of data that is to be compressed, thereby increasing the compression ratio.

BRIEF DESCRIPTION OF THE DRAWINGS

FIG. 6 illustrates details of a process performed by the prediction error converter in an example where the number of bits of a prediction error is six.

FIG. 7 illustrates a conversion table used for variable-length coding of the Huffman encoder in the encoding device.

FIG. 8 illustrates details of a process performed by an RGB addition unit of the decoding device.

FIG. 9 illustrates entropy of color component data of first to third color components which is the source of compressed data of Mode 1, Mode 2, and Mode 3 in the embodiment.

FIG. 10 illustrates advantages that are obtained when differences of pixel data between different types of color components are subjected to compression in the embodiment.

FIG. 11 illustrates compression ratios obtained by the encoding device according to the embodiment in contrast with compression ratios obtained by a JPEG-LS compression algorithm.

DETAILED DESCRIPTION OF THE INVENTION

The embodiments of the invention will now be described with reference to the drawings.

Figure 1:
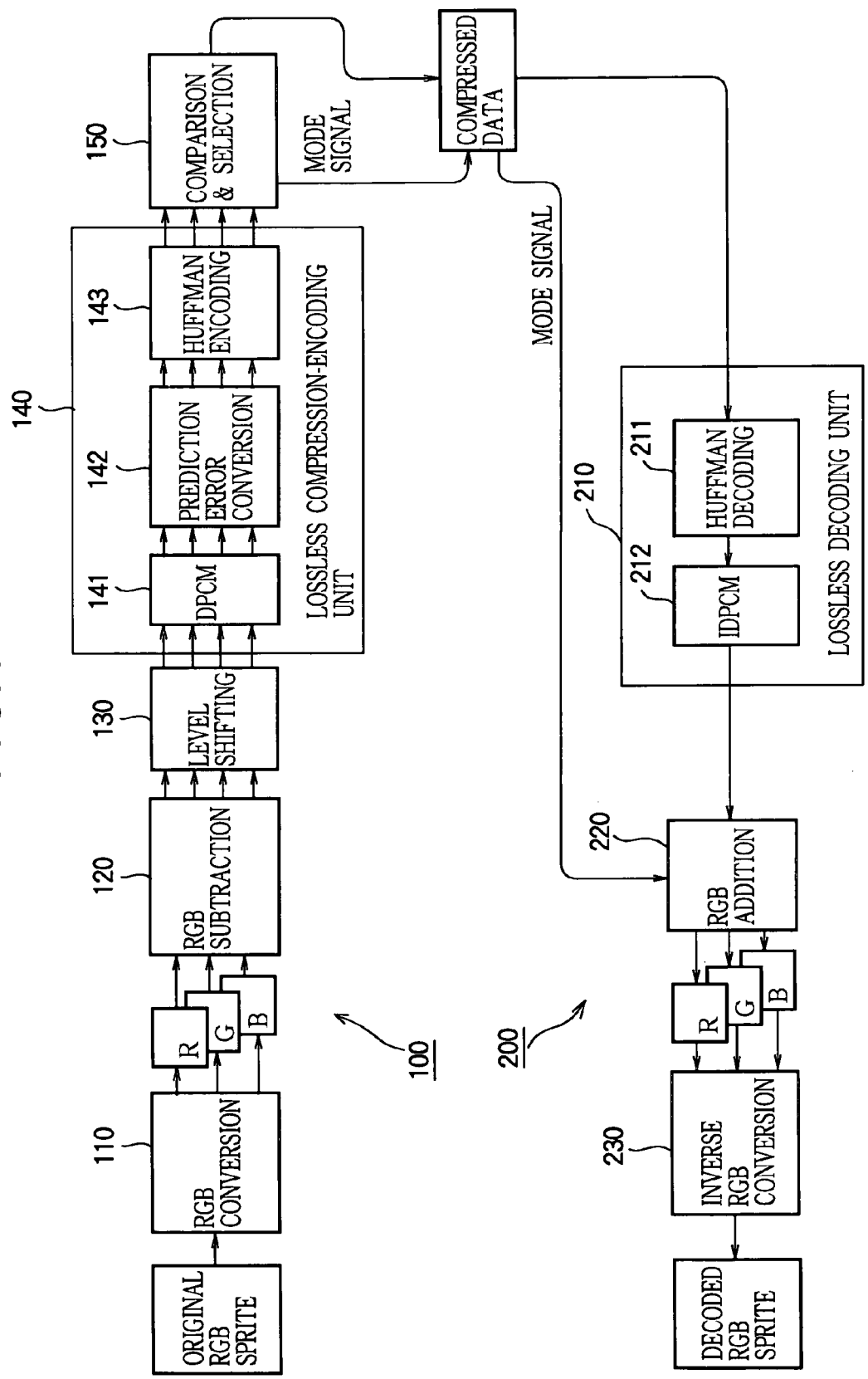
FIG. 1 is a block diagram illustrating configurations of an encoding device and a decoding device according to an embodiment of the invention.
Figure 2:
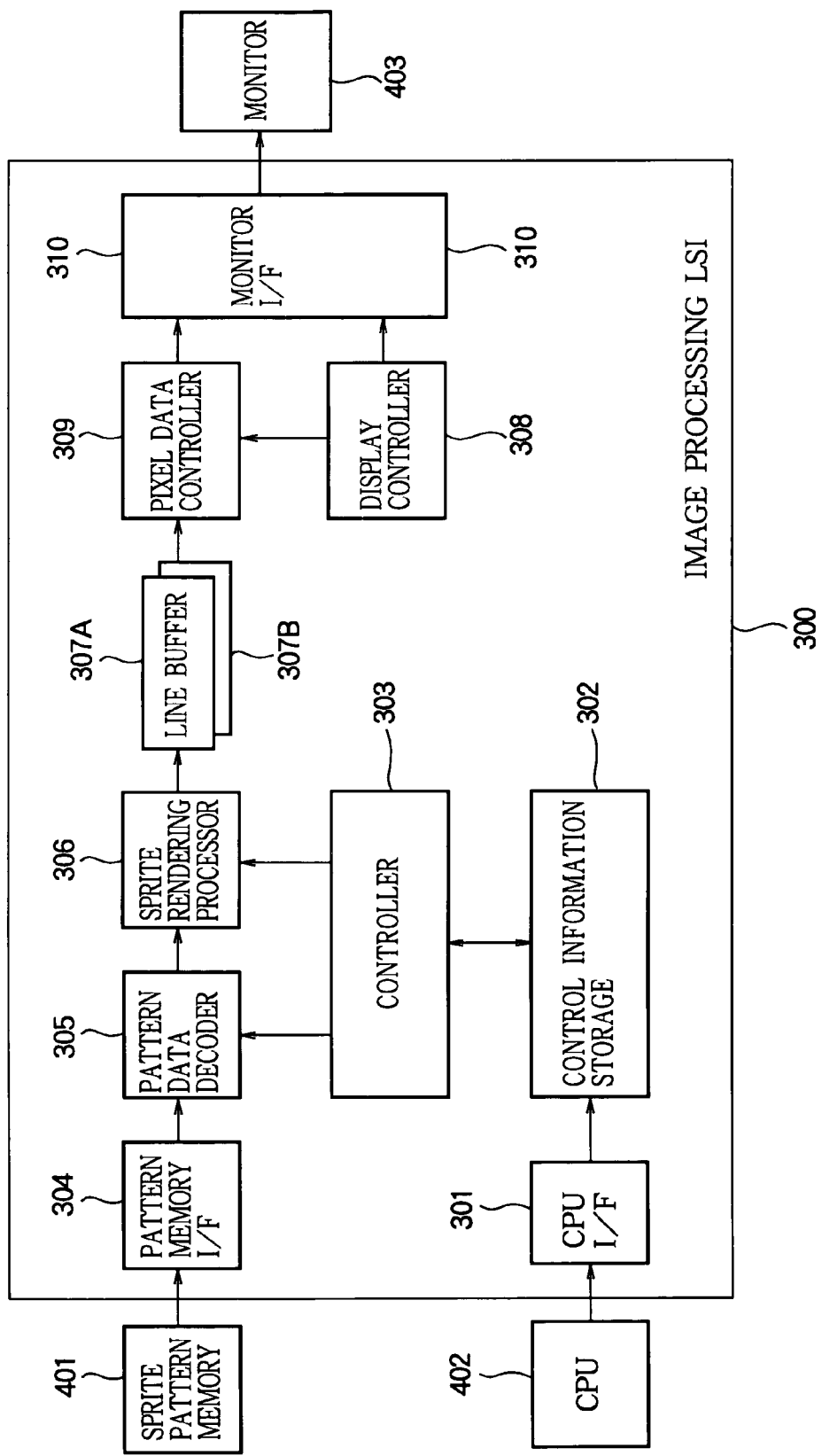
FIG. 2 is a block diagram illustrating a configuration of an image processing LSI that decodes and reproduces compressed data of a sprite image output by the encoding device.

FIG. 1 is a block diagram illustrating a configuration of a system that includes an encoding device 100 and a decoding device 200 according to an embodiment of the invention and that performs reversibly compressed transmission of a sprite image. FIG. 2 is a block diagram illustrating a configuration of an image processing LSI 300 that decodes compressed data of an image output by the encoding device 100 and that reproduces the compressed data as the image. Of the components of the image processing LSI 300, only those associated with decoding and reproduction of compressed data are illustrated in FIG. 2 and other components are not illustrated.

First, a description is given of the image processing LSI 300 with reference to FIG. 2, before the encoding device 100 and the decoding device 200 are described. In FIG. 2, a sprite pattern memory 401 stores compressed data of a plurality of types of sprite images and includes, for example, a Read Only Memory (ROM). The compressed data stored in the sprite pattern memory 401 is that output by the encoding device 100 according to this embodiment. A CPU 402 is a processor that provides a variety of control information to the image processing LSI 300. A monitor 403 is a display which includes a liquid crystal panel, or the like.

In the image processing LSI 306, a CPU interface (I/F) 301 is a device that receives a variety of control information from the CPU 402. A control information storage 302 is a device that stores control information provided from the CPU 402 through the CPU interface 301. The control information storage 302 includes, for example, a Random Access Memory (RAM). The control information provided to the control information storage 302 includes a storage destination address of compressed data of sprite images, which is to be decoded and reproduced, in the sprite pattern memory 401, a display position of the sprite image on a screen of the monitor 403, an instruction associated with scaling down or up of the sprite image, etc.

A controller 303 is a control center that controls each component of the image processing LSI 300 according to a variety of control information stored in the control information storage 302. The pattern memory interface 304 is a device that reads the compressed data of the sprite image from the sprite pattern memory 401 under control of the controller 303. A pattern data decoder 305 corresponds to the decoding device 200 of FIG. 1. Under control of the controller 303, the pattern data decoder 305 receives the compressed data of the sprite image from the sprite pattern memory 401 through the pattern memory interface 304, decodes the received compressed data, and outputs image data of the sprite image before compression. Under control of the controller 303, the pattern data decoder 305, a sprite rendering processor 306, and line buffers 307A and 307B generate image data of a sprite image that is to be displayed on the monitor 403, on a line-by-line basis (i.e., on the basis of one horizontal scan line), and perform processing for reflecting the image data in the screen of the monitor 403.

More specifically, each of the line buffers 307A and 307B has a capacity for storing an amount of pixel data corresponding to one line of the monitor 403. The controller 303 alternately uses the line buffers 307A and 307B. For example, during a period in which pixel data of one line in the line buffer 307A is displayed on the monitor 403, the controller 303 causes the sprite rendering processor 306 to perform rendering to write pixel data of a next line to the line buffer 307B, and, during a period in which pixel data of one line in the line buffer 307B is displayed on the monitor 403, the controller 303 causes the sprite rendering processor 306 to perform rendering to write pixel data of a next line to the line buffer 307A. The controller 303 performs control operation for causing the pattern data decoder 305 to output image data of the sprite image corresponding to one line for rendering so that the sprite rendering processor 306 performs rendering thereof in time. That is, the controller 303 performs control operation for causing the pattern memory interface 304 to read compressed data required to obtain image data of the sprite image of one line from the sprite pattern memory 401 and to provide the read compressed data to the pattern data decoder 305, and for causing the pattern data decoder 305 to perform decoding on the read compressed data. Here, in some case, a plurality of types of sprite images may be displayed on one line of the monitor 403. In this case, the controller 303 performs control operation for causing the pattern memory interface 304 to read compressed data required to obtain image data corresponding to one line of all sprite images that are to be displayed from the sprite pattern memory 401 and to provide the read compressed data to the pattern data decoder 305, and for causing the pattern data decoder 305 to perform decoding on the read compressed data.

A combination of a display controller 308, a pixel data controller 309, and a monitor interface 310 is a part for reading pixel data of one line alternately from the line buffers 307A and 307B, providing the read pixel data to the monitor 403, and causing the monitor 403 to display the image. More specifically, the display controller 308 provides a vertical synchronization signal and a horizontal synchronization signal to the monitor 403 through the monitor interface 310 and also sends a pixel data read instruction to the pixel data controller 309 in synchronization with the vertical synchronization signal. The pixel data controller 309 alternately selects the line buffer 307A and the line buffer 307B each time it receives a pixel data read instruction, reads pixel data of one line from the selected line buffer, and sends the read pixel data to the monitor 403 through the monitor interface 310.

Details of the image processing LSI 300 have been described above.

Compressed data generated by the encoding device 100 according to this embodiment is decoded on a line-by-line basis to be reproduced as an image as described above. Accordingly, to allow the image processing LSI 300 to perform smooth processing, the amount of compressed data of one line to be read from the sprite pattern memory 401 needs to be small, i.e., the compression ratio per line of compressed data needs to be high. In addition, this embodiment aims to achieve a high-quality image reproduction scheme which allows the monitor 403 to display the same sprite image as original before compression. To accomplish this, compressed data needs to be obtained according to a lossless compression algorithm. As a device designed to meet such needs, the encoding device 100 according to this embodiment performs compression of image data without loss or degradation and at a high compression ratio per line.

Next, the encoding device 100 and the decoding device 200 according to this embodiment are described with reference to FIG. 1. First, the encoding device 100 is described as follows. An RGB converter 110 divides image data of original sprites that is to be compressed into a plurality of image data corresponding to R, G, and B color components. Here, the image data corresponding to the R component is a set of pixel data representing the intensity of R components of pixels of the sprite, the image data corresponding to the G component is a set of pixel data representing the intensity of G components of the pixels of the sprite, and the image data corresponding to the B component is a set of pixel data representing the intensity of B components of the pixels of the sprite.

An RGB subtraction unit 120 calculates differences of pixel data between the different color components of each pixel of the sprite image and generates respective difference data representing the differences. When three pixel data represented by first to third color components of one pixel are denoted by R, G, and B, the RGB subtraction unit 120 outputs the pixel data R, G, and B, and a plurality of difference data R-G, R-B, G-R, G-B, B-R, and B-G. Each of the pixel data and the difference data is color component data that is to be compressed in this embodiment.

The level shifter 130 directly outputs the pixel data R, G, and B among the component data output by the RGB subtraction unit 120. On the other hand, for each difference data R-G, R-B, G-R, G-B, B-R, and B-G among the output component data, the level shifter 130 adds an offset to the difference data to perform level shifting on the difference data to a level in a predetermined range (specifically, a level higher than 0) and outputs the level-shifted difference data where each sign bit of the level-shifted difference data is identical.

In this embodiment, the compression target (i.e., data that is to be compressed) is image data of a plurality of types of sprites which have different numbers of bits per pixel data. In addition, the offset that the level shifter 130 uses to perform level shifting also varies depending on the number of bits of pixel data of sprites which is to be compressed. More specifically, the level shifter 130 performs level shifting on difference data by adding 32 as an offset to the difference data when one pixel data includes 5 bits, adding 64 as an offset to the difference data when one pixel data includes 6 bits, and adding 256 as an offset to the difference data when one pixel data includes 8 bits. The difference data that has been subjected to this level shifting should have a positive value.

A lossless compression-encoding unit 140 is a part for selecting a target pixel from the pixels of the sprite image in a Raster scan order, performing lossless compression-encoding on each of the plurality of types of color component data representing the target pixel, and calculating compressed data of each color component data representing the target pixel. Details of the lossless compression-encoding algorithm that the lossless compression-encoding unit 140 performs will be described later.

A comparison and selection unit 150 is a part for comparing the amounts of data of the plurality of types of compressed data obtained from the lossless compression-encoding unit 140 and selecting a combination of 3 types of compressed data, which is obtained from 3 types of color component data capable of synthesizing respective pixel data representing the original R, G, and B color components and which has a total amount of data smaller than those of other combinations, as an output target, from the plurality of compressed data obtained from the plurality of types of color component data.

Figures 3, 4, 5:
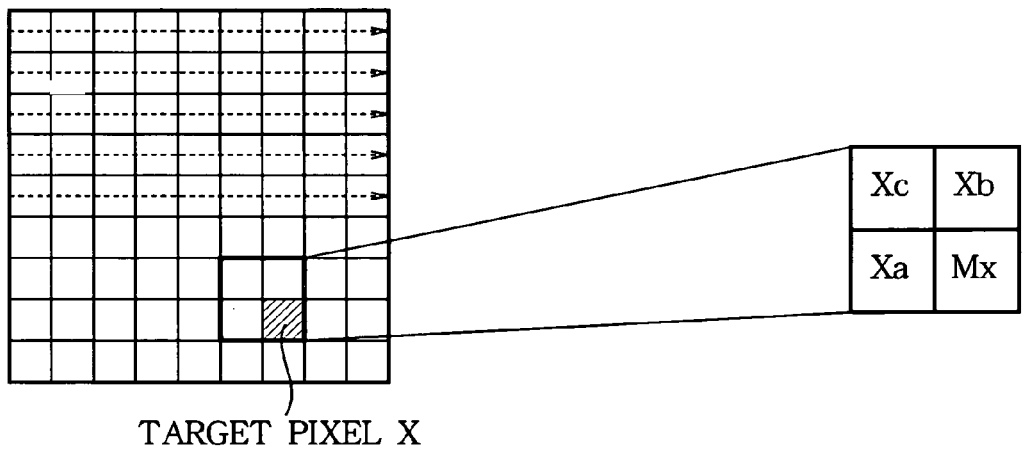
FIG. 3 illustrates details of a compression process performed by the encoding device.
FIG. 4 illustrates details of a differential coding process performed by a DPCM unit in the encoding device.
FIG. 5 illustrates details of a process performed by a prediction error converter in the encoding device.

More specifically, using the plurality of types of compressed data obtained from the lossless compression-encoding unit 140, the comparison and selection unit 150 constructs four types of combinations, each including 3 types of compressed data, as shown in FIG. 3. First, the combination of compressed data of Normal Mode is a combination of 3 types of compressed data obtained respectively from pixel data R, pixel data G, and pixel data B. Next, the combination of compressed data of Mode 1 is a combination of 3 types of compressed data obtained respectively from pixel data R, difference data R-G, and difference data R-B. Next, the combination of compressed data of Mode 2 is a combination of 3 types of compressed data obtained respectively from difference data G-R, pixel data G, and difference data G-B. Next, the combination of compressed data of Mode 3 is a combination of 3 types of compressed data obtained respectively from difference data B-R, difference data B-G, and pixel data B.

In addition, the comparison and selection unit 150 obtains the compression ratio per frame for each of the 4 types of combinations of compressed data (i.e., Normal mode, Mode 1, Mode 2, and Mode 3). The comparison and selection unit 150 then selects a combination of compressed data, which has the highest compression ratio per frame, from the 4 types of combinations of compressed data, and adds a mode signal indicating the selected compressed data combination to the selected compressed data combination, and then outputs the selected compressed data combination with the mode signal added thereto. Specifically, the comparison and selection unit 150 outputs the selected compressed data combination after adding a mode signal of "00" to the selected compressed data combination when the selected compressed data combination is Normal Mode, adding a mode signal of "01" to the selected compressed data combination when the selected compressed data combination is Mode 1, adding a mode signal of "10" to the selected compressed data combination when the selected compressed data combination is Mode 2, and adding a mode signal of "11" to the selected compressed data combination when the selected compressed data combination is Mode 3.

Next, a description is given of the lossless compression-encoding unit 140 in this embodiment. The lossless compression-encoding unit 140 includes a Differential Pulse Code Modulation (DPCM) unit 141, a prediction error converter 142, and a Huffman encoder 143.

As shown in FIG. 4, the DPCM unit 141 is a part for selecting a target pixel X from pixels of a sprite image in a Raster scan order, calculating a prediction value Mx of color component data representing the target pixel X from color component data representing a pixel adjacent to the target pixel X, and calculating a prediction error X-Mx which is the difference between the prediction value Mx and an actual value of the color component data representing the target pixel.

Specifically, the DPCM unit 141 calculates the prediction value Mx according to the following algorithm. First, when color component data of a left adjacent pixel Xa of the target pixel X is denoted by "Xa", color component data of a right upper pixel Xb of the target pixel X is denoted by "Xb", and color component data of a left upper pixel Xc of the target pixel X is denoted by "Xc", the DPCM unit 141 obtains the maximum "max(Xa, Xb, Xc)" of these 3 color component data and determines whether or not Xc=max(Xa, Xb, Xc). When it is determined that Xc=max(Xa, Xb, Xc), the DPCM unit 141 determines the prediction value Mx to be Xb if Xb<Xa and determines the prediction value Mx to be Xa if Xa<Xb. On the other hand, when Xc≠max(Xa, Xb, Xc), the DPCM unit 141 obtains the minimum "min(Xa, Xb, Xc)" of the 3 color component data and determines whether or not Xc=min(Xa, Xb, Xc). When it is determined that Xc=min (Xa, Xb, Xc), the DPCM unit 141 determines the prediction value Mx to be Xb if Xb>Xa and determines the prediction value Mx to be Xa if Xa>Xb. When Xc ≠ max(Xa, Xb, Xc) and Xc≠mix(Xa, Xb, Xc), i.e., when Xc>min(Xa, Xb, Xc) and Xc<max(Xa, Xb, Xc), the DPCM unit 141 determines the prediction value Mx to be Xa+Xb-Xc (i.e., Mx=Xa+Xb-Xc). Then, the DPCM unit 141 calculates the prediction error X-Mx which is the difference between the prediction value Mx obtained in the above manner and the actual value of the color component data of the target pixel X.

The prediction error converter 142 performs a conversion process for reversing a sign bit of the prediction error in the case where reversing the sign bit of the prediction error output by the DPCM unit 141 decreases the absolute value of the prediction error. In this embodiment, the compression target is image data of a plurality of types of sprites which have different numbers of bits per pixel data as previously described. Therefore, details of the conversion process performed by the prediction error converter 142 also vary according to the number of bits of the prediction error, i.e., the number of bits of pixel data of sprites which is to be compressed. FIG. 5 illustrates relations between input data (i.e., the prediction error) and output data of the prediction error converter 142 in each of the cases where the number of bits of the prediction error (excluding the sign bit) is 8, 6, 5, and 4. FIG. 5 illustrates relations between input data and output data only in the case where reversing the code decreases the absolute value of the input data. That is, FIG. 5 omits illustration of relations between input data and output data in the case where reversing the code does not decrease the absolute value of the input data, i.e., in the case where the input data is directly output as the output data without code reversal.

FIG. 6 illustrates relations between input data and output data of the prediction error converter 142 in the case where the number of bits of the prediction error (excluding the sign bit) is 6. In FIG. 6, arrows indicate the direction of conversion. Binary number data such as color component data and a prediction error used in this embodiment is represented by a negative number in a 2's complement form. In this case, when the number of bits of the prediction error (excluding the sign bit) is 6, sign bit reversal of a positive prediction error, whose absolute value is higher than 32, reduces the absolute value below the original absolute value. Therefore, sign bit reversal is performed on a positive prediction error whose absolute value is higher than 32 ($=2^{6-1}$). Sign bit reversal of a negative prediction error, whose absolute value is higher than 32, (i.e., which is less than −32) reduces the absolute value below the original absolute value. Therefore, sign bit reversal is performed on a negative prediction error whose absolute value is higher than 32. The same is applied to other cases with different numbers of bits of the prediction error. As shown in FIG. 5, each prediction error whose absolute value is higher than 128 ($=2^{8-1}$) is subjected to sign bit reversal in the case where the number of bits of the prediction error is 8, each prediction error whose absolute value is higher than 16 ($=2^{5-1}$) is subjected to sign bit reversal in the case where the number of bits of the prediction error is 5, and each prediction error whose absolute value is higher than 8 ($=2^{4-1}$) is subjected to sign bit reversal in the case where the number of bits of the prediction error is 4.

The Huffman encoder 143 is a part for converting the prediction error that has been processed by the prediction error converter 142 into a variable-length code. As described above, the DPCM unit 141 selects a target pixel X from pixels of a sprite image in a Raster scan order and calculates and outputs a prediction error. In this embodiment, a prediction error corresponding to each pixel, which is output from the DPCM unit 141 in a Raster scan order, is provided to the Huffman encoder 143 via the prediction error converter 142 in the same order, and, at the Huffman encoder 143, the prediction error corresponding to each pixel is converted into a variable-length code in the order in which it was provided to the Huffman encoder 143.

FIG. 7 illustrates details of a conversion table that the Huffman encoder 143 uses to convert the prediction error into a variable-length code. In FIG. 7, the encoding target is the prediction error that has been processed by the prediction error converter 142. In FIG. 7, "S" is a variable-length code group number allocated to variable-length codes which have the same code length. One variable-length code includes a code and additional bits. Here, the code is identification information used to discriminate a group to which the variable-length code belongs from other groups. Additional bits of each variable-length code in a group of variable-length codes having a specific code are identification information used to discriminate the variable-length code from other variable-length codes in the same group.

As shown in FIG. 7, an encoding target having an absolute value other than 0 is converted into a variable-length code that includes a code, the bit length of which decreases as the absolute value decreases, and additional bits. For example, 2 types of encoding targets "−1" and "1" whose absolute value is 1 are converted into a variable-length code having a group number of S=1 to which a code "01" is allocated and the 2 types of encoding targets "−1" and "1" are discriminated through respective additional bits "0" and "1". In addition, 4 types of encoding targets "−3", "−2", "2", and "3" whose absolute value is within a range of 2-3 are converted into a variable-length code having a group number of S=2 to which a code "10" is allocated and the 4 types of encoding targets "−3", "−2", "2", and "3" are discriminated through respective additional bits "00", "01", "10", and "11". Similarly, the remaining encoding targets are divided into groups, each having consecutive absolute values, and a code having a greater bit length is allocated to a group of encoding targets having greater absolute values. As the absolute values of encoding targets of each group, excluding the group of encoding targets having an absolute value of 256, increase, the number of the encoding targets of the group increases and the bit length of additional bits used to discriminate the encoding targets also increases. The maximum number of bits (excluding the sign bit) of the prediction error used in this embodiment is 8 and both "−256" and "256" denote an overflow state. Thus, "−256" and "256" are converted into the same variable-length code which has a code of "11111110" and includes no additional bits.

In the case of each encoding target having an absolute value of 0, a Zero Run Length (ZRL) of the encoding target, which is the length of consecutive 0s, is converted into a variable-length code. For example, a ZRL of 1 is converted into a variable-length code having a group number of S=9 to which a code of "000" is allocated. 2 types of ZRLs "2" and "3" which belong to a range of 2-3 are converted into a variable-length code having a group number of S=10 to which a code "0010" is allocated and the 2 types of ZRLs "2" and "3" are discriminated through respective additional bits "0" and "1". 4 types of ZRLs "4", "5", "6", and "7" which belong to a range of 4-7 are converted into a variable-length code having a group number of S=11 to which a code "00110" is allocated and the 4 types of ZRLs "4", "5", "6", and "7" are discriminated through respective additional bits "00", "01", "10", and "11". Similarly, the remaining ZRLs are divided into groups, each including consecutive ZRLs, and a code having a greater bit length is allocated to a group of greater ZRLs. As the ZRLs of the group increases, the number of the ZRLs of the group increases and the bit length of additional bits used to discriminate the ZRLs also increases. In addition, in this embodiment, it is assumed that a type of prediction error, which is referred to as "ALL0", is generated in order to increase compression ratio. "ALL0" indicates a state in which a prediction error of a pixel of interest is 0 and prediction errors of all pixels, which are subsequent to the pixel of interest in a line including the pixel of interest, are all 0. In this embodiment, ALL0 is converted into a variable-length code which has a code of "001110" and includes no additional bits.

Details of the encoding device 100 according to this embodiment have been described above.

Next, a description is given of the decoding device 200.

A lossless decoding unit 210 is a device that converts compressed data generated through the lossless compression-encoding process of the lossless compression-encoding unit 140 back into original image data before compression. The lossless decoding unit 210 in this embodiment includes a Huffman decoder 211 and an Inverse Differential Pulse Coding (IDPCM) unit 212. The Huffman decoder 211 uses the same conversion table as the Huffman encoder 143 used in the encoding device 100 for variable-length coding, and restores a variable-length code including code bits and additional bits to a prediction error before compression.

The IDPCM unit 212 is a device that reconstructs respective color component data of first to third color components by performing an inverse differential coding process to convert a prediction error obtained from the Huffman decoder 211 into color component data represented by the prediction error. More specifically, in the case where a prediction error of the pixel X is received from the Huffman decoder 211 when color component data of the three pixels $X_c$, $X_b$, and $X_a$ shown in FIG. 4 have already been decoded for one of the first to third color components, the IDPCM unit 212 calculates, in the inverse differential coding process, a prediction value MX of the color component data of the pixel X from the color component data of the adjacent pixels $X_c$, $X_b$, and $X_a$ according to the same algorithm as that of the differential coding process of the DPCM unit 141 described above. The IDPCM unit 212 then calculates the color component data of the pixel X by adding the prediction error of the pixel X to the prediction value MX.

In this embodiment, as described above, the level shifter 130 is provided upstream of the DPCM unit 141 in the encoding device 100, and the level shifter 130 performs level shifting on color component data, which is to be subjected to differential coding of the DPCM unit 141, to a range higher than 0. Therefore, in the inverse differential coding of the IDPCM unit 212, it is assumed that the color component data before differential coding is a positive value and a portion, excluding the sign bit in the prediction error, of the result of the addition of the prediction value MX and the prediction error is treated as color component data as the result of decoding. Accordingly, in this embodiment, the same color component data is reconstructed from prediction errors if portions excluding the sign bit in the prediction errors are the same, regardless of whether each of the prediction errors has a positive value having a sign bit of "0" or a negative value having a sign bit of "1". The purpose of providing the prediction error converter 142 in the lossless compression-encoding unit 140 of the encoding device 100 is to decrease the absolute value of the encoding target (i.e., the prediction error) that is provided to the Huffman encoder 143, and to decrease the bit length of the variable-length code after conversion, with utilizing the fact that whether the sign bit of the prediction error is "1" or "0" does not affect the decoding result. Details of this design are described as follows with reference to an example.

First, it is assumed that the number of bits of each of the color component data and the prediction error (excluding the sign bit) is 6 and color component data of the target pixel X in FIG. 6 is 59d (where d denotes a decimal value), the prediction value is 10d, and the prediction error is 49d=0110001b (where b denotes a binary value and the first "0" is the sign bit). Here, when it is assumed that the prediction error converter 142 has not performed the prediction error conversion, the encoding device 100 and the decoding device 200 perform the following processes. First, the Huffman encoder 143 converts the prediction error 49d into a 12-bit variable-length code including a code 111110 and additional bits 110001 belonging to the group of the group number of S=6 according to the conversion table shown in FIG. 7, and outputs the 12-bit variable-length code. In the decoding device 200, the Huffman decoder 211 converts the variable-length code into a prediction error 49d. Then, the IDPCM unit 212 performs binary addition of the prediction value, which is 10d=0001010b, and the prediction error, which is 49d=0110001b, to reconstruct the color component data 59d of the target pixel X as represented by the following equation.

$$0001010b + 0110001b = 0111011b = 59d \quad (1)$$

On the other hand, the encoding device 100 and the decoding device 200 perform the following processes according to the invention when the prediction error converter 142 has performed the prediction error conversion. First, when the prediction error "49d" is converted into a binary number, it is 0110001b (where b denotes a binary value and the first "0" is the sign bit) as shown in FIG. 6. When the sign bit at the head of the binary number is reversed from "0" to "1", a decimal number corresponding to the binary number 1110001b after reversal of the code bit is −15d, the absolute value of which is smaller than the absolute value 49d before reversal of the sign bit as shown in FIG. 6. Therefore, the prediction error converter 142 in the encoding device 100 transmits the prediction error with the reversed sign bit "1110001b=−15d" to the Huffman encoder 143. The Huffman encoder 143 then converts the prediction error "1110001b=−15d" into an 8-bit variable-length code including a code 1110 and additional bits 0000 belonging to the group having the group number of S=4 according to the conversion table of FIG. 7, and outputs the 8-bit variable-length code. In the decoding device 200, the Huffman decoder 211 converts the variable-length code into a prediction error of 1110001b=−15d. Then, the IDPCM unit 212 performs binary addition of the prediction value, which is 10d=0001010b, and the prediction error, which is −15d=1110001b, as represented by the following equation.

$$0001010b + 1110001b = 1111011b \quad (2)$$

Then, the IDPCM unit 212 neglects the sign bit "1" at the head of the addition result "1111011b" and determines that the color component data of the target pixel X is "111011b=59d". In this manner, the color component data, which is the result of decoding, is determined from both the prediction value and the bits, excluding the sign bit, of the prediction error. Therefore, in the case where reversing the sign bit of the prediction error decreases the absolute value of the prediction error, the prediction error converter 142 in the encoding device 100 in this embodiment reverses the code of the prediction error and transmits it to the Huffman encoder 143, and the Huffman encoder 143 reduces the bit length of the variable-length code which constitutes the compressed data.

The RGB addition unit 220 is a synthesizing part that performs a process corresponding to inverse conversion of the process performed by the RGB subtraction unit 120 in the encoding device 100. FIG. 8 illustrates details of the process performed by the RGB addition unit 220. First, the RGB addition unit 220 extracts a mode signal from the compressed data that is to be decoded and determines the adopted mode of the compressed data among Normal Mode, Mode 1, Mode 2, and Mode 3 based on the mode signal.

When the mode signal indicates Normal Mode, color component data R' of the first color component, color component data G' of the second color component, and color component data B' of the third color component obtained from the IDPCM unit 212 are pixel data R of the first color component, pixel data G of the second color component, and pixel data B of the third color component of the sprite image that were subjected to compression, respectively. Therefore, the RGB addition unit 220 outputs, as the pixel data R, G, and B of the first to third color components, the color component data R', G', and B' of the first to third color components obtained from the IDPCM unit 212 without change.

When the mode signal indicates Mode 1, the color component data R' of the first color component obtained from the IDPCM unit 212 is the pixel data R of the first color component of the sprite image that was subjected to compression.

Therefore, the RGB addition unit 220 outputs, as pixel data R of the first color component, the color component data R' of the first color component obtained from the IDPCM unit 212 without change. However, when the mode signal indicates Mode 1, the color component data of the second color component obtained from the IDPCM unit 212 is data obtained by subtracting the pixel data G of the second color component from the pixel data R of the first color component of the sprite image that was subjected to compression and performing level shifting on the resulting data through the level shifter 130. In addition, when the mode signal indicates Mode 1, the color component data of the third color component obtained from the IDPCM unit 212 is obtained by subtracting the pixel data B of the third color component from the pixel data R of the first color component of the sprite image that was subjected to compression and performing level shifting on the resulting data through the level shifter 130. Therefore, the RGB addition unit 220 restores the color component data G' and B' to color component data G" and B" before level shifting and outputs a difference R'−G" (=R−(R−G)=G) as the pixel data G of the second color component and outputs a difference R'−B" (=R−(R−B)=B) as the pixel data B of the third color component. The same is applied to the case where the mode signal indicates Mode 2 or Mode 3 and the RGB addition unit 220 outputs data items shown in FIG. 8 as the pixel data R, G, and B of the first to third color components.

The inverse RGB converter 230 is a device that combines the pixel data R, G, and B of the first to third color components output from the RGB addition unit 220 and reconstructs the image data of the sprite.

Details of the encoding device 100 and the decoding device 200 according to this embodiment have been described above.

The following is a description of the advantages of this embodiment.

(1) The color components of R, G, and B of a color image are not independent of each other and instead are strongly correlated with each other. In this embodiment, differences of pixel data between different types of color components are compressed and therefore it is possible to remove redundancy of data that is to be compressed (i.e., a common part or background part of pixel data of each color component) and to reduce the dynamic range of data that is to be compressed, thereby increasing the compression ratio. Details of these advantages are described as follows with reference to FIGS. 9 and 10.

FIG. 9 illustrates entropy in unit of bits per pixel (namely, results of calculation of compression performance limits per pixel) of color component data of first to third color components which are the source of the compressed data of each of Mode 1, Mode 2, and Mode 3 in this embodiment in the case where 12 types of standard images of the Standard Image Data Base (SIDBA) are used. Each of the standard images has a size of 256 pixels in a height direction H and a size of 256 pixels in a width direction W and has 8 bits as TONE (gray level) information of each pixel.

In FIG. 9, "±" represents the degree of reduction of entropy (i.e., the degree of improvement of entropy characteristics). In FIG. 9, the entropy of the first color component data (i.e., pixel data R) is used as reference entropy of color component data which is the source of the compressed data of Mode 1, and the degree of reduction of entropy of other color component data (i.e., difference data G−R and B−R) relative to the reference entropy is illustrated. The entropy of the second color component data (i.e., pixel data G) is used as reference entropy for color component data which is the source of the compressed data of Mode 2 and the degree of reduction of entropy of other color component data (i.e., difference data R−G and B−G) relative to the reference entropy is illustrated. The entropy of the third color component data (i.e., pixel data B) is used as reference entropy for color component data which is the source of the compressed data of Mode 3 and the degree of reduction of entropy of other color component data (i.e., difference data G−B and R−B) relative to the reference entropy is illustrated. For example, in the case of each color component data of Mode 1 of a standard image "Aerial", the entropy of the color component data R of the first color component is 7.31 bits per pixel. The entropy of the color component data G−R of the second color component is 6.81 bits per pixel and is reduced by only 0.5 relative to the color component data R. The entropy of the color component data B−R of the third color component is 7.23 bits per pixel and is reduced by only 0.08 relative to the color component data R.

In FIG. 9, the degree of reduction of entropy (i.e., the degree of improvement of entropy characteristics) is represented by numerical values without parentheses and the degree of increase of entropy (i.e., the degree of deterioration of entropy characteristics) is represented by numerical values in parentheses. It can be seen from FIG. 9 that entropy is not reduced in any of Modes 1 to 3 in the cases of Pepper and Milkdrop images whereas entropy is expected to be reduced in any of Modes 1 to 3 in the cases of the other 10 types of standard images. Thus, it can be seen that it is possible to improve the compression ratio by performing lossless compression of Modes 1 to 3 which encode differences between pixel data of different types of color components.

FIG. 10 illustrates results of calculation of both the compression ratio of an entire image and the worst value of the compression ratios of lines of the image in the case where compressed data of each of Normal Mode and Modes 1 to 3 is generated through the lossless compression-encoding unit 140 for the same 12 standard images as those of FIG. 9. The compression ratio is a value obtained by dividing the amount of data after compression by the amount of data before compression. However, in this example, the DPCM unit 141 of the lossless compression-encoding unit 140 performs prediction error calculation according to a differential coding algorithm which uses a previous value (the value of the left adjacent pixel Xa in the example shown in FIG. 4) as a prediction value instead of using the differential coding algorithm described in the above embodiment. In addition, in this example, the Huffman encoder 143 performs variable-length coding according to a conversion table employed by JPEG instead of the conversion table shown in FIG. 7. Further, in this example, the level shifter 130 and the lossless compression-encoding unit 140 do not perform their respective processes.

It can be seen from FIG. 10 that, in many standard images, the compression ratio of the entire image of compressed data of any of Modes 1 to 3 is improved compared to that of compressed data of Normal Mode. It can also be seen that the worst value of the compression ratios of lines of compressed data of any of Modes 1 to 3 is significantly improved compared to that of compressed data of Normal Mode. It can be considered that this improvement is due to the combined effects of the two features of this embodiment that color component data representing each pixel of the image is subjected to differential coding and variable-length coding in a Raster scan order and that differences of pixel data between different types of color components are subjected to differential coding and variable-length coding in this embodiment. That is, it can be considered that the worst compression ratio is significantly improved because the absolute value of the prediction error is easily reduced in differential coding and the frequency at which prediction errors of target pixels are continuously zero is increased, and the frequency at which prediction errors in variable-length coding are handled as ZRL or ALL0 is also increased in regions of the same or similar colors in the same line since differences of pixel data between different types of color components having a smaller dynamic range than the original pixel data are subjected to differential coding.

The advantage in that the worst value of the compression ratios of lines is significantly improved also provides a considerable advantage to a device that performs decoding on compressed data on a line by line basis as the image processing LSI 300 of FIG. 2 described above does. Details are as follows. First, if the compression ratio of compressed data of a sprite image varies between lines and there is a line having a very small compression rate, the amount of compressed data used to decode pixel data of the line is large. This causes an undesirable situation in which it is difficult to perform transmission of compressed data required for decoding such that the pixel data of the line is decoded in time. However, in this embodiment, it is possible to prevent such an undesirable situation since the worst value of the compression ratios of the lines is significantly improved through lossless compression of any of Modes 1 to 3.

(2) In this embodiment, the prediction error converter 142 reverses the sign bit of the prediction error in the case where reversal of the sign bit of the prediction error obtained through differential coding decreases the absolute value of the prediction error and the Huffman encoder 143 performs variable-length coding, which decreases the code length as the absolute value decreases, on the prediction error that has been processed by the prediction error converter 142 to generate a variable-length code representing the prediction error. Therefore, from the viewpoint of the entire image or pixels of one line, the absolute value of the prediction error that is to be subjected to variable-length coding is reduced on the whole and thus it is possible to reduce the bit length of the variable-length code as a whole.

(3) The following is a general advantage of this embodiment. FIG. 11 illustrates compression ratios of compressed data obtained through compression performed on 30 types of evaluation images according to a lossless compression algorithm of JPEG-LS in contrast with compression ratios of compressed data obtained through compression performed by the encoding device 100 according to this embodiment. In FIG. 11, each numerical value in a column denoted by "±" represents the degree of improvement of a compression ratio obtained in this embodiment with respect to a reference compression ratio obtained through the lossless compression algorithm of JPEG-LS. In the column, the degree of improvement of the compression ratio is represented by a positive value for each evaluation image for which the compression ratio obtained in this embodiment is improved compared to the compression ratio obtained through the lossless compression algorithm of JPEG-LS, and the degree of deterioration of the compression ratio is represented by a negative value for each evaluation image for which the compression ratio obtained in this embodiment is deteriorated compared to the compression ratio obtained through the lossless compression algorithm of JPEG-LS. Although a compression ratio slightly less than that of JPEG-LS is obtained for the evaluation image op_24 among the 30 types of evaluation images, a compression ratio higher than that of JPEG-LS is obtained for all of the other 29 types of evaluation images.

<Other Embodiments>

Although one embodiment of the invention has been described above, other embodiments may also be provided according to the invention. The following are examples.

(1) The level shifter 130 and the prediction error converter 142 may be omitted in the above embodiment.

(2) Although an algorithm which combines differential coding and variable-length coding is employed as the lossless compression algorithm of the lossless compression-encoding unit 140 in the above embodiment, other lossless compression algorithms may also be employed.

(3) Details of the compressed data of Modes 1 to 3 in the above embodiment may be changed as follows.

<Mode 1 Before Change> <Mode 1 after Change>

| 1st color component | R | R |
|---|---|---|
| 2nd color component | R-G | G-R |
| 3rd color component | R-B | B-R |

<Mode 2 Before Change> <Mode 2 after Change>

| 1st color component | G-R | R-G |
|---|---|---|
| 2nd color component | G | G |
| 3rd color component | G-B | B-G |

<Mode 3 Before Change> <Mode 3 after Change>

| 1st color component | B-R | R-B |
|---|---|---|
| 2nd color component | B-G | G-B |
| 3rd color component | B | B |

These embodiments achieve the same advantages as those of the above embodiment.

What is claimed is:

1. A lossless compression-encoding device for compression of pixels of an image, each pixel being composed of different types of pixel data corresponding to first, second and third color components of the image, the device comprising:

a calculation part that calculates differences of pixel between the different types of the pixel data representing the first, second and third color components of each pixel of the image, and that outputs the calculated differences as a plurality of types of difference data;

a lossless compression-encoding part that performs lossless compression-encoding on each of color component data which include the different types of the pixel data representing the first to third color components and the plurality of the types of the difference data, and that outputs a plurality of types of compressed data which correspond to the respective types of the color component data; and a comparison and selection part that compares amounts of data of the plurality of the types of the compressed data obtained from the lossless compression-encoding, and that selects, as an output target, a combination of three types of compressed data corresponding to three types of color component data capable of synthesizing the respective pixel data representing the first, second and third color components such that a total amount of data of the selected combination is smaller than a total amount of data of other combinations of the compressed data, wherein the comparison and selection part selects the output target from four combinations of the compressed data, the four combinations consisting of one combination of three types of compressed data obtained from respective pixel data representing the first to third color components, and three combinations of the compressed data, each of the three combinations being obtained from both one type of pixel data representing a kth color component (k=1-3) among the first to third color components and two types of difference data which are differences between pixel data representing the kth color component and respective pixel data representing the other two types of color components, and wherein the comparison and selection part incorporates a mode signal into the output target, the mode signal indicating three types of color component data, which are sources of the three types of the compressed data contained in the selected combination.

2. The lossless compression-encoding device according to claim 1, wherein the lossless compression-encoding part sequentially selects a target pixel from the pixels of the image in a raster scan order, performs the lossless compression-encoding on each color component data of the selected target pixel, and outputs the compressed data.

3. A decoding device comprising:
a decoding part that performs a decoding process on three types of compressed data obtained through a lossless compression-encoding process to generate first to third color component data;
a mode signal acquisition part that acquires a mode signal indicating respective types of the first to third color component data among different types of color component data including three types of pixel data respectively representing three types of color components of a pixel and a plurality of types of difference data which are differences of pixel data between the pixel data representing different types of the color components of each pixel, wherein the mode signal indicates a normal mode and three other modes, the normal mode comprises one combination of three types of compressed data obtained from respective pixel data representing the first to third color components, and each of the three other modes comprises a combination being obtained from both one type of pixel data representing a kth color component among the first to third color components and two types of difference data which are difference between pixel data representing the kth color component and respective pixel data representing the other two types of color components, wherein K=1-3; and
a synthesizing part that performs a calculation process using the first to third color component data in association with the mode signal to generate the three types of pixel data representing the three types of color components of the pixel from the first to third color component data.

* * * * *